US012716703B2

(12) United States Patent
Hutchinson

(10) Patent No.: US 12,716,703 B2
(45) Date of Patent: Aug. 25, 2026

(54) ADJUSTABLE DIAMETER STEP PIN APPARATUS

(71) Applicant: Lockheed Martin Corporation, Bethesda, MD (US)

(72) Inventor: Andrew Logan Hutchinson, Palmdale, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 350 days.

(21) Appl. No.: 18/583,181

(22) Filed: Feb. 21, 2024

(65) Prior Publication Data

US 2025/0264319 A1 Aug. 21, 2025

(51) Int. Cl.
*G01B 3/48* (2006.01)
*G01B 3/52* (2006.01)

(52) U.S. Cl.
CPC .................................... *G01B 3/48* (2013.01); *G01B 3/52* (2013.01)

(58) Field of Classification Search
CPC ............... G01B 3/48; G01B 3/50; G01B 3/52
USPC ........................................................ 33/199 R
See application file for complete search history.

(56) References Cited

U.S. PATENT DOCUMENTS 1,289,640 A 12/1918 Buchanan
1,343,479 A 6/1920 Rouanet
1,626,176 A 4/1927 Atwood
1,897,774 A 2/1933 Sunnen
2,816,364 A 12/1957 Fairfield
2,861,347 A 11/1958 Von Tarnik
2,903,797 A 9/1959 Porter
3,050,861 A 8/1962 Ruble
3,176,404 A 4/1965 Herzog
3,497,250 A 2/1970 Sommer
3,719,367 A * 3/1973 Baturka ................ B23B 31/208 82/155
3,785,059 A 1/1974 Breau
3,992,259 A * 11/1976 Anthony ................ G21C 3/331 376/440
4,229,130 A * 10/1980 Franklin ............... B23B 31/208 408/239 R
4,790,073 A 12/1988 DuPlanti
5,042,161 A 8/1991 Hodge (Continued)

FOREIGN PATENT DOCUMENTS

EP 4442391 A1 * 10/2024 ........... B23B 31/107
KR 102660402 B1 * 4/2024 ............. B23B 31/20

*Primary Examiner* — George B Bennett
(74) *Attorney, Agent, or Firm* — Baker Botts L.L.P.

(57) ABSTRACT

Embodiments of the present disclosure provide an adjustable diameter step pin apparatus. The adjustable diameter step pin apparatus includes a body element and a head element having a thumb screw portion and a threaded portion. The body element includes a plurality of threaded finish structures. The body element may be configured to receive a collet along a longitudinal slot of the adjustable diameter step pin apparatus. The thumb screw portion may be configured to rotate to alter the collet and the threaded portion may be configured to engage with the plurality of threaded finish structures when assembled with the body element. In an embodiment, the head element may be rotatable to engage the threaded portion of the head element into the plurality of threaded finish structures to alter the collet while keeping the body element sturdy.

20 Claims, 7 Drawing Sheets

(56) References Cited

U.S. PATENT DOCUMENTS

| | | | | | |
|---|---|---|---|---|---|
| 5,182,865 | A * | 2/1993 | Greenslade | G01B 5/252 | 33/550 |
| 5,379,505 | A * | 1/1995 | Reed | B23G 5/06 | 29/888.011 |
| 5,383,673 | A * | 1/1995 | Mogilnicki | B23B 31/202 | 279/49 |
| 7,269,906 | B1 * | 9/2007 | Lee | B25H 7/04 | 33/666 |
| 7,464,478 | B2 * | 12/2008 | Adrian | B23Q 17/2404 | 33/642 |
| 7,913,414 | B2 * | 3/2011 | Bumgardner | G01B 3/28 | 33/806 |
| 9,416,907 | B2 * | 8/2016 | Jaoui | F16L 55/11 | |
| 10,618,116 | B2 * | 4/2020 | Woodman | B23B 31/2012 | |

* cited by examiner

ADJUSTABLE DIAMETER STEP PIN APPARATUS

TECHNICAL FIELD

This disclosure generally relates to step pins and, more specifically, to an adjustable diameter step pin apparatus.

BACKGROUND

Existing apparatuses and systems face many challenges in performing proper tooling methodologies. For example, current tooling methodologies use precision ground step pins that may face challenges in locating parts and assemblies for performing tooling of jigs and fixates/fixtures. One of the traditional assemblies includes an outside procurement (OP) vendor to produce parts that allow the vendor to manufacture the parts with loose tolerances. When designing a match drill fixture for these parts, precision step pins may need to be used to ensure the proper alignment of these parts to the tooling parts. The use of precision step pins ensures positional and angular engineering requirements to meet the boring of these tooling parts. Boring of the tooling parts involves challenges as they are fracture-critical assemblies.

The incoming boring parts in the existing assemblies include a hole location tolerance of +/−0.010" (0.020" total allowable per hole). The step pin (or pins) fits into the fixture using large step fits, and the size of the step pin does not change, as the fixture is the final size. The step pin then fits into the bore part (with the application of a small step fit).

SUMMARY OF PARTICULAR EMBODIMENTS

According to some embodiments, an adjustable diameter step pin may be disclosed. The adjustable diameter step pin includes a solid body, a thumb screw, a double angle (DA) collet, and a gauge pin set. In an embodiment, to use an adjustable diameter step pin, a collet of the desired size is loaded into the body; for example, a 0.375" (⅜) collet may collapse accurately up to 8% (0.345"), providing an increment range of 0.345" to 0.375" for this collet size. In an embodiment, the collet size may include a feature for stepping up or down to get the desired size This stepping up or down feature enables the use of any gauge pin of any diameter size. For example, the gauge pin may be of any size precision step pin desired and may be inserted instantly into the collet size. Using the adjustable diameter step pin allows a user to select a diameter of 0.001" or 0.0005" increments. Accordingly, one tool may be used with different sizes and with precision accuracy instead of machining many precision ground pins.

According to some embodiments, an adjustable diameter step pin apparatus is disclosed. The adjustable diameter step pin apparatus includes a body element, and a head element having a thumb screw portion and a threaded portion. The body element includes a plurality of threaded finish structures. The body element may be configured to receive a collet along a longitudinal slot of the adjustable diameter step pin apparatus. The thumb screw portion may be configured to rotate to alter the collet and the threaded portion may be configured to engage with the plurality of threaded finish structures when assembled with the body element. In an embodiment, the head element may be rotatable to engage the threaded portion of the head element into the plurality of threaded finish structures to alter the collet while keeping the body element sturdy.

According to some embodiments, an adjustable diameter step pin system is disclosed. The adjustable diameter step pin system includes a collet, a body element, and a head element. The collet includes a collet inside diameter (ID). The body element includes a knob and a precision ground shaft element. The knob of the body element includes a plurality of threaded finish structures, and the precision ground shaft element may be attached to the knob. The knob and the precision ground shaft element define a longitudinal slot of the adjustable diameter step pin system. The head element includes a thumb screw portion, a threaded portion, and a collet chamber. The thumb screw portion may be configured to rotate to alter or compress a predetermined size of the collet about the collet inside diameter. The threaded portion may be configured to engage with the plurality of threaded finish structures when assembled with the body element. The collet chamber may be configured to couple to the collet. The collet coupled to the collet chamber may be received by the body element along the longitudinal slot. The collet inside diameter of the collet may be altered/compressed by rotating the thumb screw portion of the head element to engage the threaded portion of the head element into the plurality of threaded finish structures while keeping the body element sturdy.

According to some embodiments, a method of assembling an adjustable diameter step pin apparatus is disclosed. The method includes coupling a collet to the adjustable diameter step pin apparatus. The adjustable diameter step pin apparatus includes a body element having a plurality of threaded finish structures. The body element may be configured to receive the collet along a longitudinal slot. The adjustable diameter step pin apparatus includes a head element that includes a thumb screw portion configured to rotate to alter or compress the collet and a threaded portion configured to engage with the plurality of threaded finish structures when assembled with the body element. The method further includes rotating the thumb screw portion of the head element to engage the threaded portion of the head element into the plurality of threaded finish structures while keeping the body element sturdy.

According to some embodiments, the method may be performed using components of an adjustable diameter step pin system.

Technical advantages of certain embodiments include providing the collet size with a feature for stepping up or down to get the desired size. This stepping-up or down feature enables the use of any gauge pin of any diameter size. For example, the gauge pin may be of any size precision step pin desired and may be inserted instantly into the collet size. Using the adjustable diameter step pin allows a user to select a diameter of 0.001" or 0.0005" increments. Accordingly, one tool may be used with different sizes and with precision accuracy instead of machining many precision ground pins. The present disclosure allows for many options of using the step pins to fit any size of the gauge set sturdily. The manufacturing of the precision grind step pins takes a considerable amount of time and material. With this reusable tool, any suitable number of sizes may be adjusted immediately without any manufacturing downtime.

Other technical advantages of certain embodiments include Adjustable Diameter Pin (ADP) that provide a quick remedy solution to shortcomings of the traditional tooling and boring methods at a lower cost. For example, a manufacturing scenario may be required to create the ADP. To condition a potential variation of the tooling parts and fix loose Geometrical Dimensioning and Tolerancing (GD&T), over eighty (80) precision ground step pins may need to be made to bore four holes. The ADP may be used to reduce the amount of precision ground step pins to complete the boring task. One or more ways may be applied to match drill components with a fixture properly, and the ways may include a) locating, indexing, and securing fixtures to a part (by applying a method that uses precision ground step pins, performing large step fits snuggly in tooling bore, and securing small step fits snuggly into the undersized bore in part), and b) forming boreholes one at a time, which involves pinning a fixture to a part after a final diameter is achieved. These ways of matching drill components achieve an alignment between the fixture and tool. To make a match drill fixture, a machined hole pattern needs to be established in the fixture that determines the final location of the holes to be transferred into the part. In some examples, a minimum of two (2) pins may be used to (a) locate a part or assembly to tooling jig or fixture to ensure alignment or position of the boring parts/entities with each other, and (b) prevent movement between the bore parts/entities during the manufacturing process. This keeps the fixture and bore part completely aligned and "locked" during boring to prevent the fixture from moving. Typically, a precision ground step is ground 0.001" to 0.0005" undersized for the hole it is pinning into. The hole location tolerance and necessary pin-to-part tolerance contribute to the need for many precision ground pins and ADP provides tolerance of the tooling parts.

Other technical advantages will be readily apparent to one skilled in the art from the following figures, descriptions, and claims. Moreover, while specific advantages have been enumerated above, various embodiments may include all, some, or none of the enumerated advantages.

DESCRIPTION OF EXAMPLE EMBODIMENTS

Figure 1:
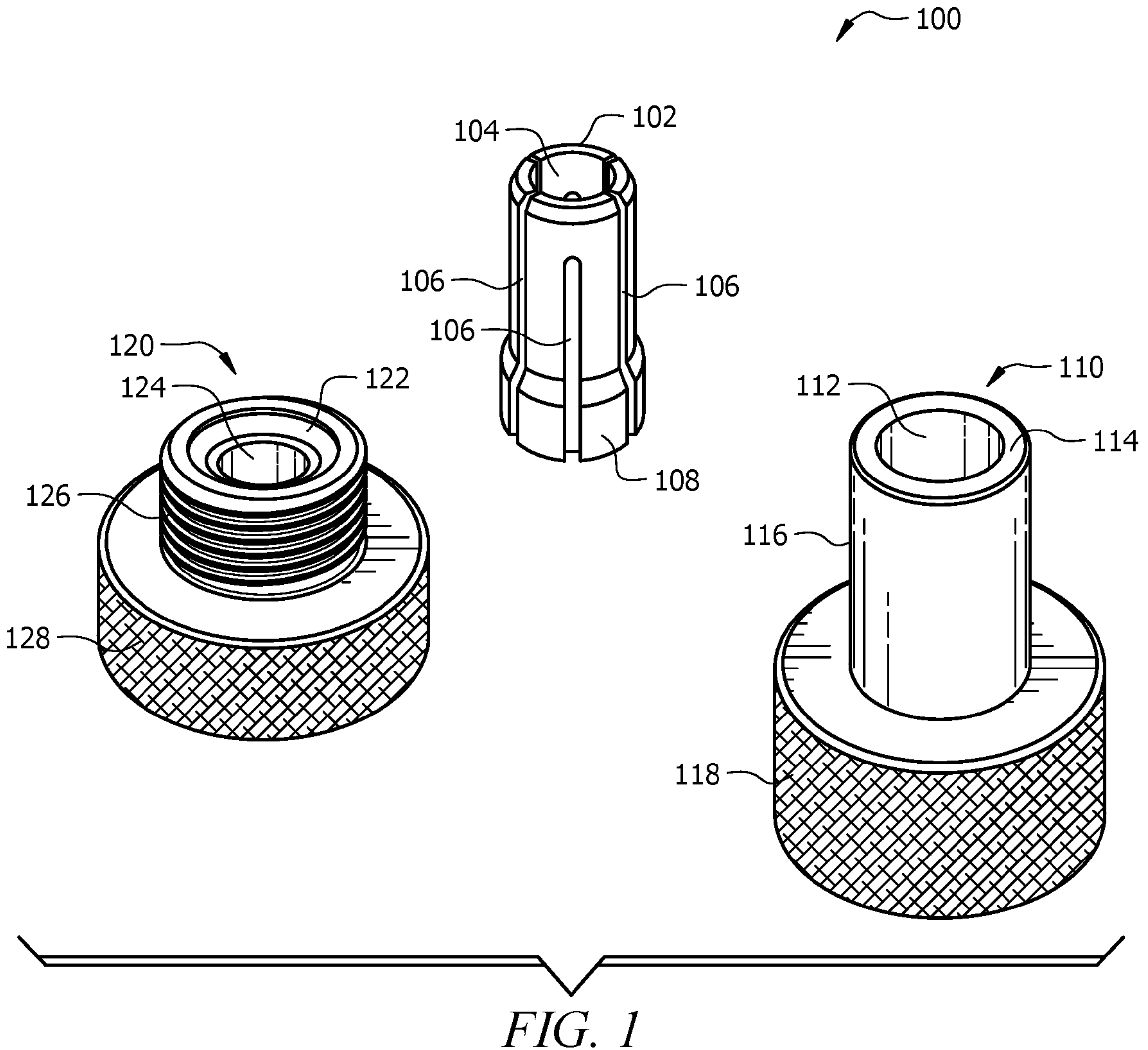
FIG. 1 illustrates different parts of an adjustable diameter step pin apparatus, according to certain embodiments.

Existing apparatuses and systems face many difficult challenges in providing proper tooling in a quick time frame to support adjustable diameter pins (ADP). One of the traditional assembly approaches includes using an outside procurement (OP) vendor to produce parts that allow the vendor to manufacture the parts with loose tolerances. When designing a match drill fixture for these parts, precision step pins may need to be used to ensure proper boring of these parts as they are fracture-critical assemblies. Because of loose geometrical dimensioning and tolerance (GD&T), over eighty (80) precision ground step pins may need to be made to bore four holes. To reduce the amount of precision ground step pins needed to complete the boring task, an Adjust Diameter Step Pin may be needed. One or more ways may be applied to match drill components with a fixture properly. The ways may include a) locating, indexing, and securing fixtures to a part (by applying a method that uses precision ground step pins, performing large step fits snuggly in tooling bore, and securing small step fits snuggly into the undersized bore in part), and b) forming boreholes one at a time that involves pinning a fixture to a part after a final diameter is achieved. These ways of matching drill components achieve an alignment between the fixture and tool. To make a match drill fixture, a machined hole pattern needs to be established in the fixture that determines the final location of the holes to be transferred into the part. The incoming parts in the existing assemblies include a hole location tolerance of +/−0.010" (0.020" total allowable per hole). The step pin fits (or pins) into the fixture (using the large step fits), and the size of the step pin does not change, as the fixture is the final size, and then fits (or pins) into the part (with the application of small step). This keeps the fixture and part completely aligned and "locked" during boring to prevent the fixture from moving. Typically, a precision ground step is ground 0.001" to 0.0005" undersized for the hole it is pinning into. The hole location tolerance and necessary pin-to-part tolerance contribute to the need for many precision ground pins.

To address these and other problems, the teachings of the disclosure provide collapsing a collet of any collet size accurately. For example, a collet of any desired size may be loaded into the body element, and the collet of size 0.375" (3/8) may collapse accurately up to 8% (0.345"), achieving an increment range of 0.345"-0.375" for this collet size. In an embodiment, the collet size may include a feature for stepping up or down to get the desired size. This stepping-up or down feature enables the use of any gauge pin of any diameter size. For example, the gauge pin may be of any size precision step pin desired and may be inserted instantly into the collet size. Using the adjustable diameter step pin allows a user to select a diameter of 0.001" or 0.0005" increments. Accordingly, one tool may be used with different sizes and with precision accuracy instead of machining many precision ground pins. The diameter increments allow one tool to have numerous sizes with precision accuracy instead of machining eighty (80) precision ground pins to support the effort. The present disclosure allows for many options of using the step pins to fit any size of the gauge set with instant results of sturdiness. The manufacturing of the precision grind step pins takes a considerable amount of time and material. With this reusable tool, practically infinite sizes with high precision accuracy can be adjusted on the spot without waiting for more shop/manufacturing time to produce the end-line product.

The following examples of certain embodiments are given to facilitate a better understanding of the present disclosure. In no way should the following examples be read to limit or define the scope of the disclosure. Embodiments of the present disclosure and its advantages may be best understood by referring to the included FIGURES, where like numbers are used to indicate like and corresponding parts.

FIG. 1 illustrates different parts of an adjustable diameter step pin apparatus 100, according to certain embodiments. In an embodiment, different components, elements, and parts of the adjustable diameter step pin apparatus 100 may be made of any metal, for example, aluminum, steel, or any other metallic component that may be lightweight. The quality of the metal may be 4140 or 4340 or any other suitable quality. The adjustable diameter step pin apparatus includes a collet 102, a body element 110, and a head element 120.

In an embodiment, the collet 102 may include a double-angle (DA) collet. For example, a DA 200 collet (DA 200 series collet) may be used. In some embodiments, DA collets 102 may have the same outer mold line (OML) dimensions, and only the inside diameter changes. For example, DA 200 of size 0.375 may be a 3.8" ID and a DA 200 of size 0.250 may be a 1.4" ID. The collets may be interchangeable within the ADP that provides a single tool ranging from 0.001" to 0.4375" from COTS DA 200 collets. In an embodiment, the collet of size 0.375" (⅜) may be utilized to collapse accurately by 8% (down to 0.345"), achieving an increment range of "0.345"-0.375" for this collet size. The collet size may be stepped up or down to get any desired size to receive and couple any size and diameter of gauge set. In an embodiment, the collet 102 may include a plurality of threaded tapering sides 106. A top portion 104 of the collet 102 defines a hole and enables the collet 102 to receive a gauge pin set. When the collet 102 is collapsed (into any desired size) by rotating the head element 120 into a plurality of threaded finish structures (304 of 110) of the body element 110, the collet 102 may be configured to sturdily couple the gauge pin set of any size and any structure. The collet 102 includes a collet base 108 that can be placed in the head element 120.

Figure 7:
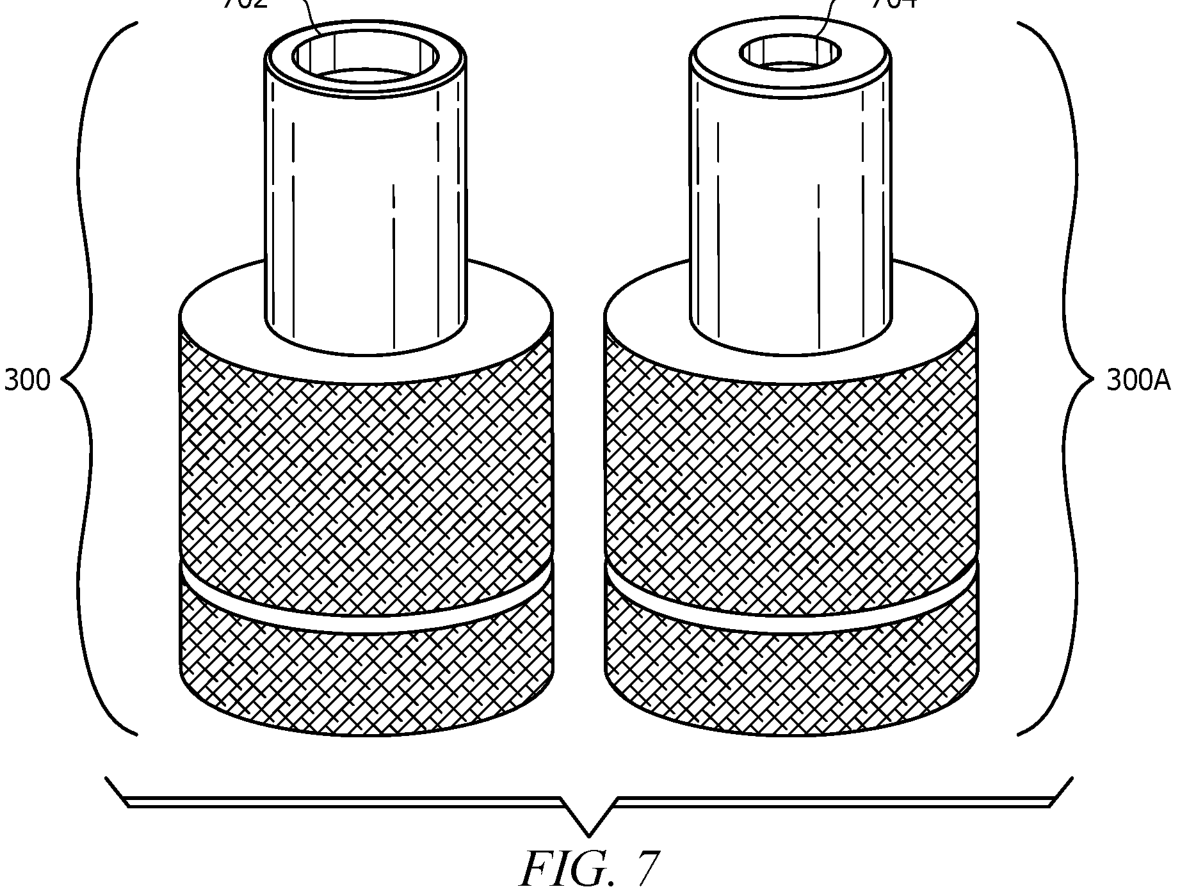
FIG. 7 illustrates assembled views of different adjustable diameter step pin according to certain embodiments.

In an embodiment, the body element 110 includes a knob portion 118 and an elongated portion 116. In an embodiment, the knob portion 118 may include knurled finish structure outside diameter (O.D.). The interior diameter portion of the knob portion 118 includes a plurality of threaded finish structures (304 in FIG. 3). The plurality of threaded finish structures (304) may be configured to receive and couple with a threaded portion (126) of the head element 120 to tighten into or loosen from the body element 110 to achieve collapsing the collet size of the collet 102 or expanding the collet size of the collet 102. The knob portion 118 may be joined with the elongated portion 116 of the body element 110. This helps in aligning the ADP 200 to the tool jig or fixture. Additionally the gauge pin may locate to the bore part or assembly. The three elements together, that is, ADP, tool, and bore part, encompass the use and alignment of the ADP. In an embodiment, both interior and exterior diameters of the elongated portion 116 may be polished finish structures. The interior diameter of the elongated portion 116 may be configured to receive and couple with the collet 102 when the collet 102 may be inserted into a longitudinal slot 112 via the knob portion 118. The longitudinal slot 112 may be formed or created during the manufacturing process and may be uniform throughout the interior portion of the body element 110. In an embodiment, the collet 102 may be configured to be placed on the interior portion of the elongated portion 116 when the threaded portion (126) is coupled with the plurality of threaded finish structures (304) of the body element 110. In some embodiments, a top part 114 of the elongated portion 116 may be configured in a circular fashion to match the collet 102. The circular portion of the top part 114 may be configured with any radius dimension at the circumference as shown. For example, FIG. 1 shows a part of the radius of the top part 114 to become part of the longitudinal slot 112. In some embodiments, the radius measurement of the top part 114 may be configured differently for different kinds of adjustable diameter step pin apparatuses. For example, FIG. 7 shows a top parts (702, 704) for a different kind of adjustable diameter step pin apparatus (300-A in FIG. 7) with a different radius portion at the top parts 702, 704 that creates a different dimension of the longitudinal slot.

In an embodiment, the head element 120 may be a thumb screw. The head element 120 includes a collet chamber 122, a hollow center portion 124, a threaded portion 126 at the exterior diameter of the head element 120, and a thumb screw portion (head knob) 128. The collet chamber 122 may be any polished or knurled surface and configured to couple to the collet base 108 of the collet 102. The hollow center portion 124 may be concentric to the longitudinal slot 112 to form a slotted path with the body element 110, for example, the slotted path may be throughout the interiors of both head element 120 and the body element 110 including the collet 102 having an open hole (in its interior as well) beginning from a base part of the head element 120 toward the top part 114 of the body element 110. The threaded portion 126 may be formed at the exterior part of the head element 120, as shown in FIG. 1. The threaded portion 126 may be configured to couple or engage with the plurality of threaded finish structures (304) when assembled or coupled to the body element 110. The thumb screw portion (head knob) 128 may be configured to be held by a user to rotate into or out from the plurality of threaded finish structures (304) configured on the interior portion of the knob portion 118 of the body element 110. For example, a collapsing act includes the user holding the thumb screw portion 128 and rotating the thumb screw portion 128 into the plurality of threaded finish structures (304) to collapse the collet size. Another example is an expansion act that may be achieved by rotating the thumb screw portion 128 out of the plurality of threaded finish structures (304) (in reverse rotation direction compared to collapsing act), the collet size can be expanded. In this way, the thumb screw portion 128 of the head element 120 may be rotatable to engage the threaded portion 126 of the head element 120 into or out of the plurality of threaded finish structures (304) to alter or compress the collet by its dimension and diameter size. In an embodiment, the inside diameters of both the head element 120 and body element 110 may be "threaded" on the mating perspective male and female part ends. Both pieces may be configured with "knurled" outside diameter surface finishes to provide grip to the user during set up "tightening" and "loosing" of the ADP assembly. Both the collapsing act and expansion act may be achieved by rotating the thumb screw portion 128 while holding/keeping the body element 110 sturdy and fixed.

Figure 2A:
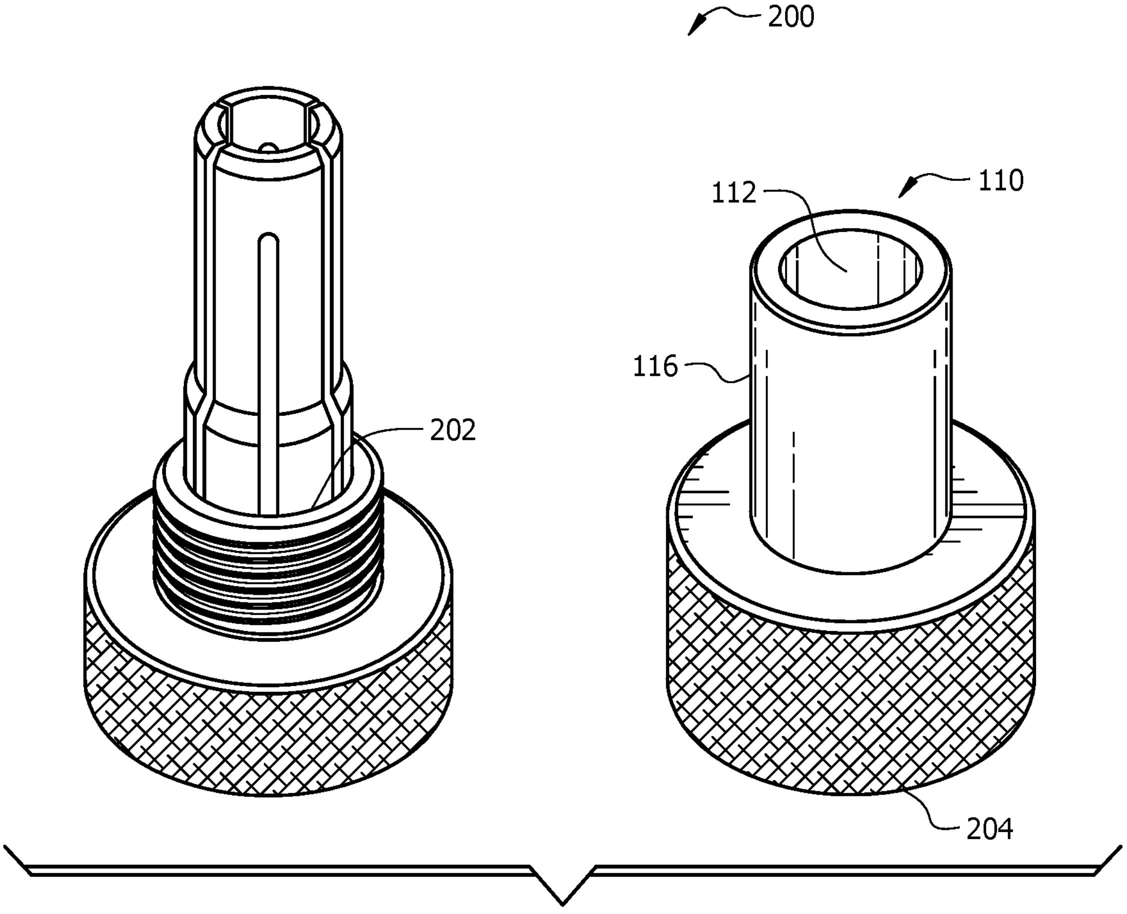
FIG. 2*a* illustrates an assembled view of an adjustable diameter step pin apparatus, according to certain embodiments.

FIG. 2*a* illustrates an assembled view 200 of an adjustable diameter step pin apparatus, according to certain embodiments. As shown in FIG. 2*a*, as a first step of assembling, the collet base 108 may be placed or coupled to the collet chamber 122 of the head element 120. The assembled portion 202 of the collet 102 with the head element 120 is depicted as 202. The assembled portions 202 may be inserted into the body element 110 via the longitudinal slot 112 at the base part 204 of the body element 110. After inserting the assembled portion 202 into the longitudinal slot 112, the collet 102 may be coupled to the interior portion of the elongated portion 116 and the threaded portion 126 may couple with the plurality of threaded finish structures (304) on the interior portion of the knob portion 118.

Figure 2B:
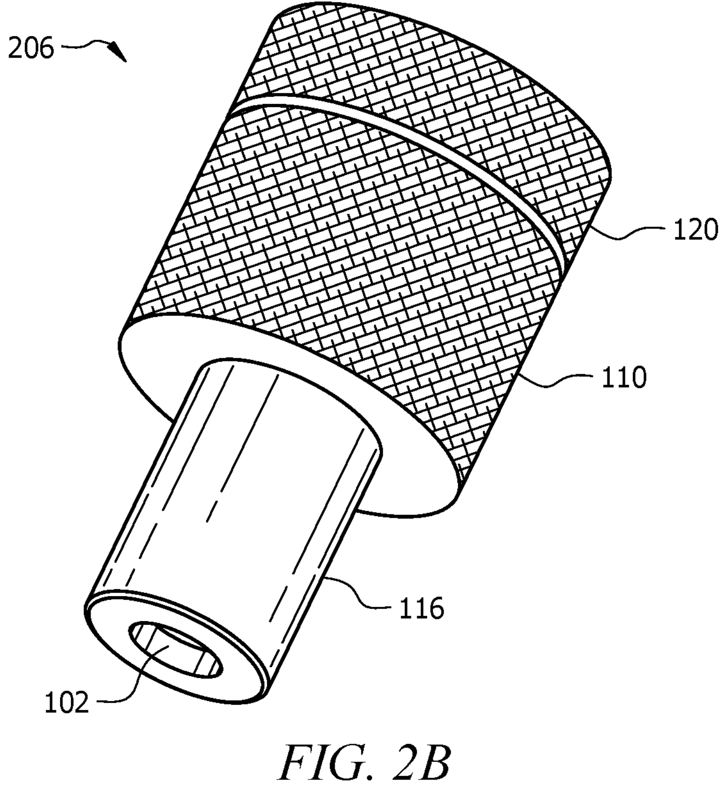
FIG. 2*b* illustrates an isometric view of the assembled adjustable diameter step pin apparatus, according to certain embodiments.

FIG. 2*b* illustrates an isometric view 206 of assembled adjustable diameter step pin apparatus 100 or assembly 100, according to certain embodiments. The isometric view 206 includes the assembling of the head element 120 coupled with the collet 102 and the body element 110 having collet base 108 placed on the collet chamber 122 and extending the insertion of the collet 102 into the elongated portion 116 of the body element 110.

Figure 2C:
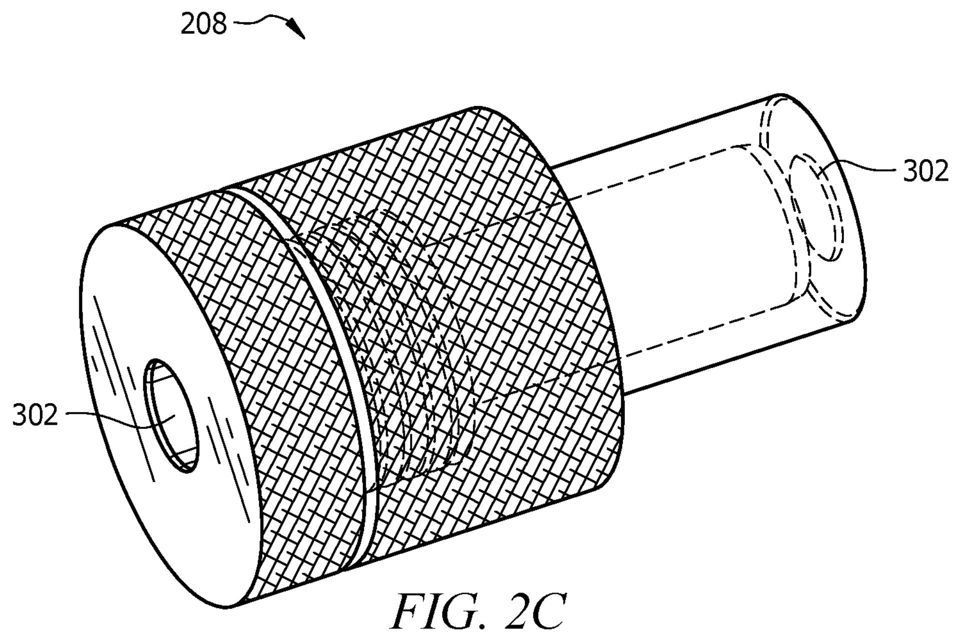
FIG. 2*c* illustrates a transparent view of an adjustable diameter step pin apparatus, according to certain embodiments.

FIG. 2*c* illustrates a transparent view 208 of the adjustable diameter step pin apparatus 100 after assembling, according to certain embodiments. After assembling the head element 120 coupled with the collet 102 and the body element 110 having collet base 108 placed on the collet chamber 122 and extending the insertion of the collet 102 into the elongated portion 116 of the body element 110, the slotted path 302 (in FIG. 3) may be formed by the hollow center portion 124 of the head element 120 that may be concentric with the longitudinal slot 112 of the body element 110.

Figure 3:
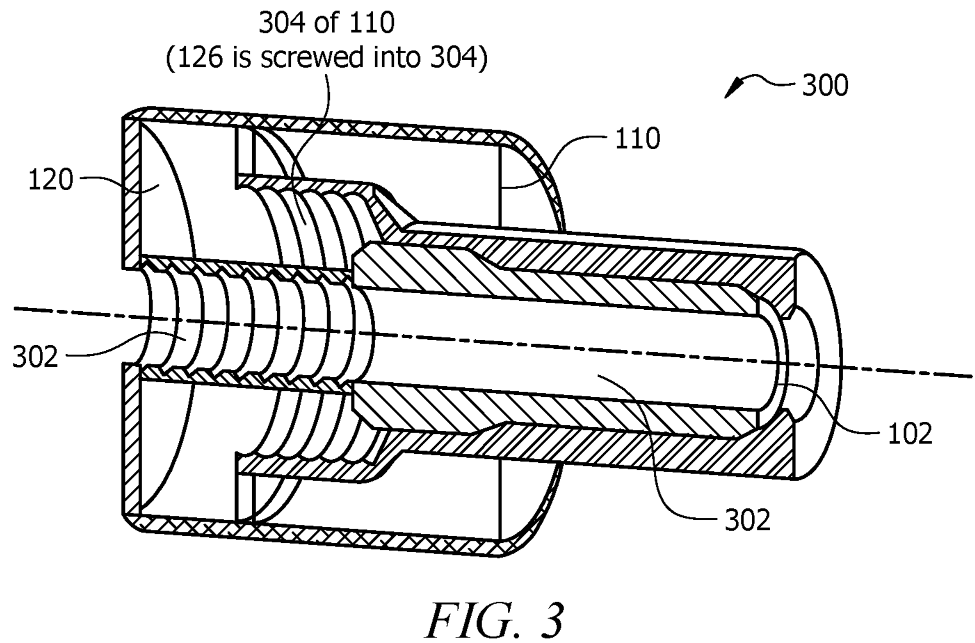
FIG. 3 illustrates a sectional view of an adjustable diameter step pin apparatus, according to certain embodiments.

FIG. 3 illustrates a sectional view 300 of the adjustable diameter step pin apparatus 100 after assembling, according to certain embodiments. The slotted path 302 is formed by the hollow center portion 124 of the head element 120 and may be concentric with the longitudinal slot 112 of the body element 110. The sectional view 300 also shows the engaging or coupling of the threaded portion 126 of the head element 120 with the plurality of knurled finish structures 304 of the body element 110.

Figure 4:
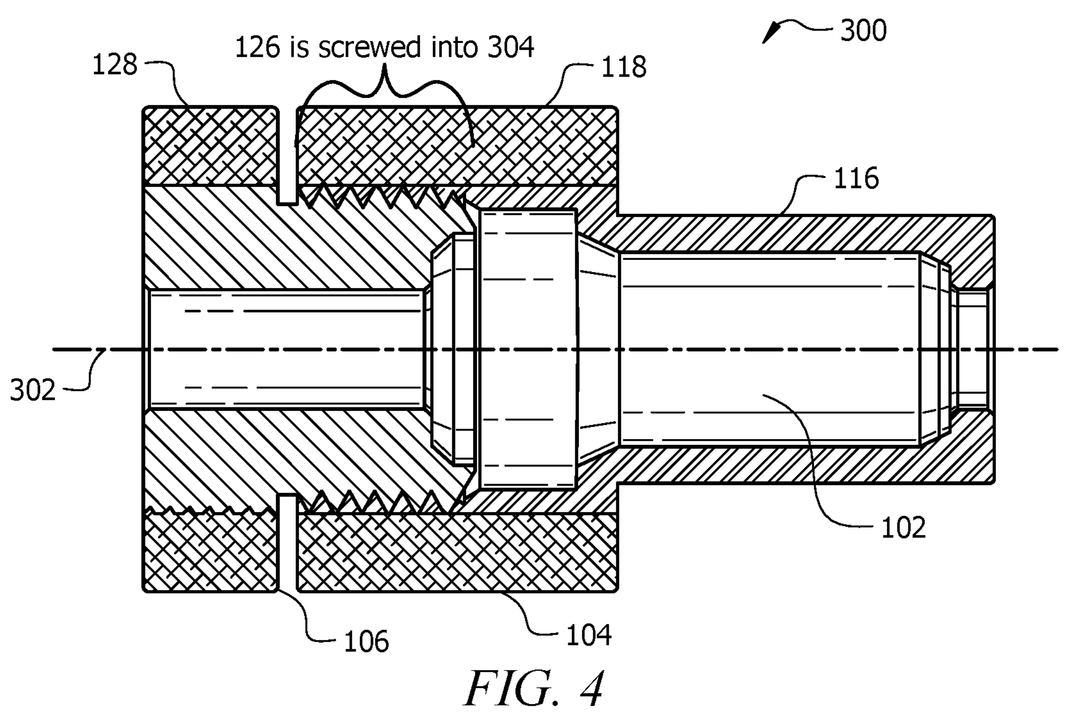
FIG. 4 illustrates a side view of an assembly of an adjustable diameter step pin apparatus, according to certain embodiments.

FIG. 4 illustrates a side view 300 of an assembly of the adjustable diameter step pin apparatus 100 after assembling, according to certain embodiments. The side view 300 shows engaging or coupling of the threaded portion 126 of the head element 120 with the plurality of threaded finish structures 304 of the body element 110. The threaded portion 126 on the exterior part of the head element 120. The plurality of threaded finish structures 304 may be configured or crafted in the interior portion of the knob portion 118, which may be the knurled structure on the outside of the body element 110. The slotted path 302 is also shown in FIG. 4. By rotating (for the collapsing act) the thumb screw portion 128, the threaded portion 126 may be screwed/tightened into the plurality of threaded finish structures 304 that collapse the collet size of the collet 102 to hold or fit any size of gauge pin set securely.

Figure 5:
FIG. 5 illustrates a body element (body view) of an adjustable diameter step pin apparatus, according to certain embodiments.
Figure 5:
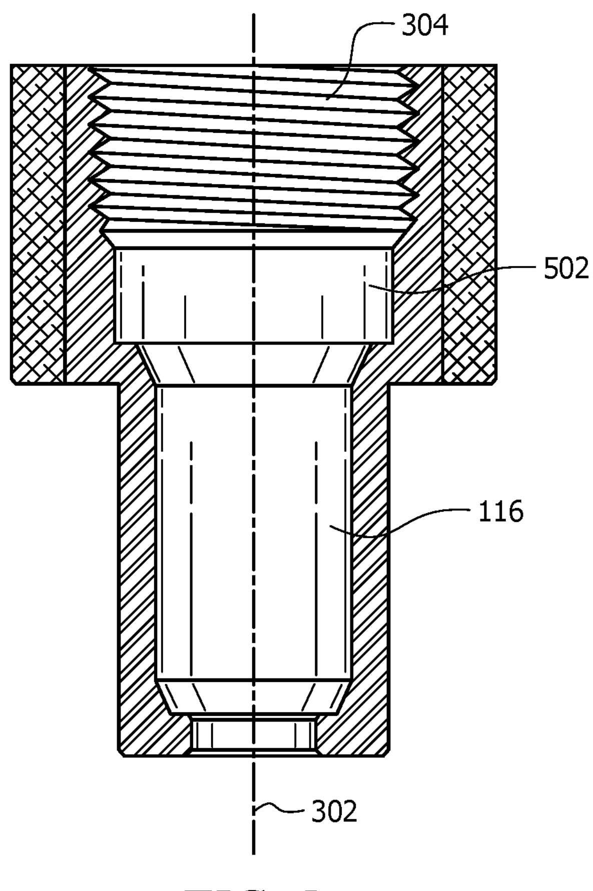

FIG. 5 illustrates a body element 110 (body view) of the adjustable diameter step pin apparatus 100, according to certain embodiments. The body element 110 holds the collet and gauge pin to keep the assembly 300 concentric.

Figure 6:
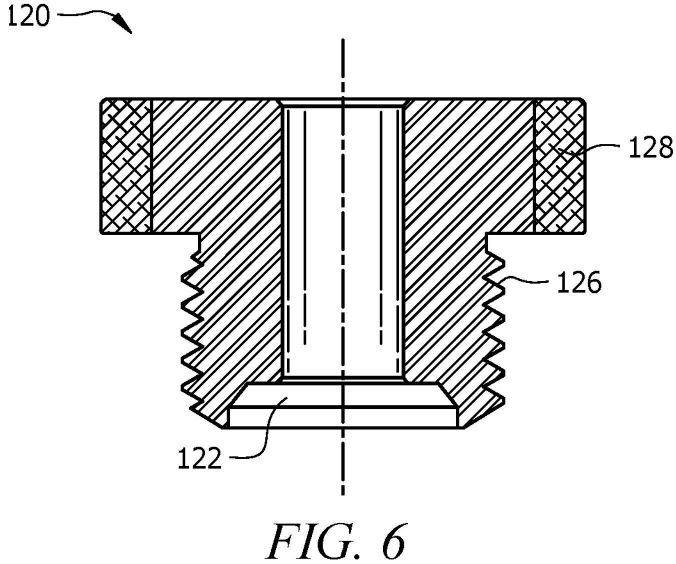
FIG. 6 illustrates a head element (head view) of an adjustable diameter step pin apparatus, according to certain embodiments.

FIG. 6 illustrates a head element 120 (head view) of the adjustable diameter step pin apparatus 100, according to certain embodiments. The head element 120 compresses the collet, gripping the gauge pin.

FIG. 7 illustrates assembled views of different adjustable diameter step pin systems (300 and 300-A), according to certain embodiments. ADP system 300 has a large inside diameter 702 and ADP system 300A has a smaller inside diameter 704. The larger inside diameter 702 allows a larger gauge pin and larger associated DA 200 collet inside diameter to be used.

Figures 8, 9:
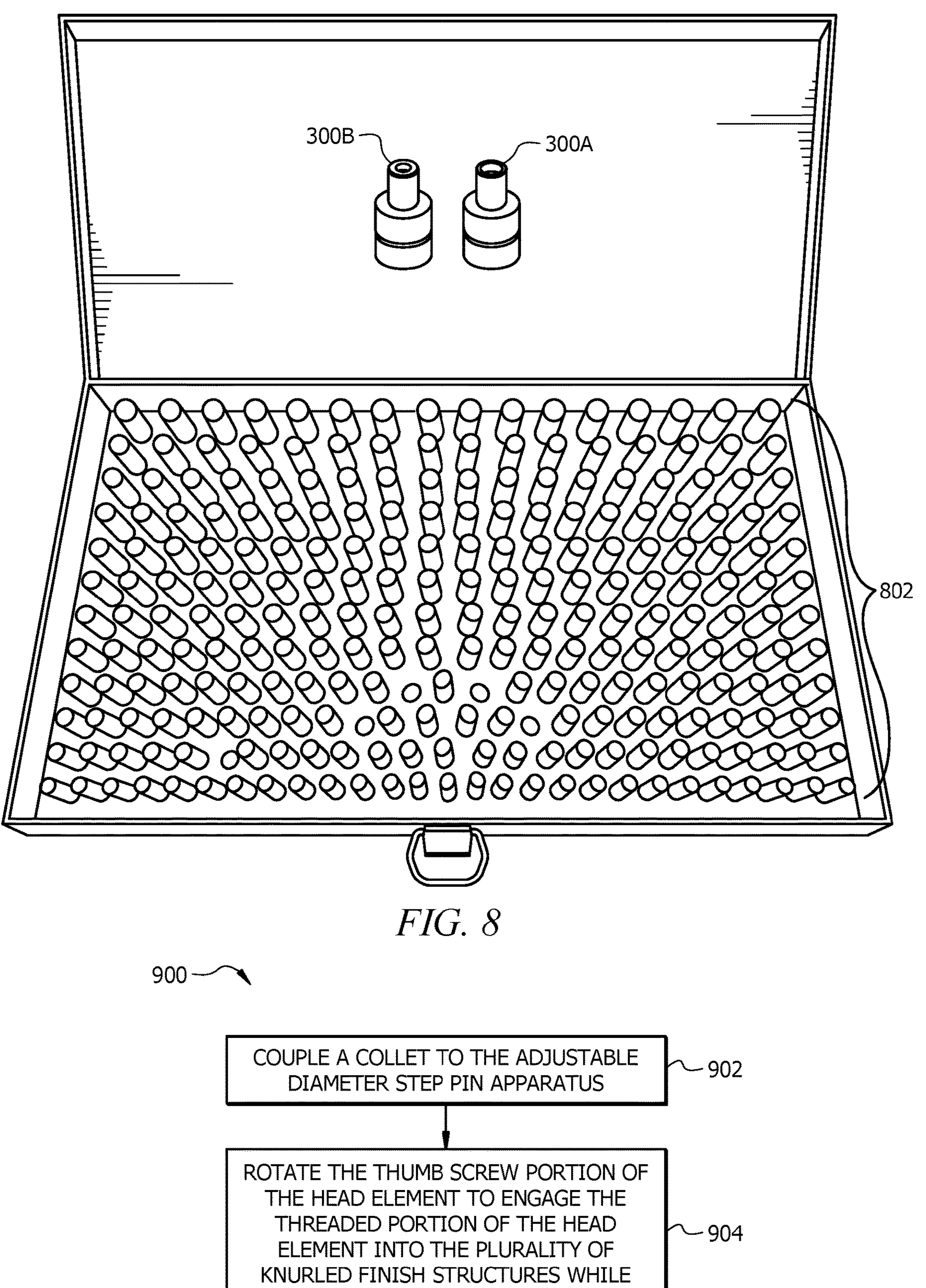
FIG. 8 illustrates different gauge pin sets showing the sizing capability of an adjustable diameter step pin apparatus, according to certain embodiments.
FIG. 9 illustrates a flowchart for assembling various components and parts to form an adjustable diameter step pin apparatus and system, according to certain embodiments.

FIG. 8 illustrates different gauge pin sets showing the sizing capability of the adjustable diameter step pin apparatus/systems that may include any of 300 and 300-A, according to certain embodiments. In an embodiment, both systems 300 and 300-A may be configured to fit, or couple with any gauge pin sets that enable both systems 300 and 300-A to be versatile for any gauge pin size 802, as shown in FIG. 8.

FIG. 9 illustrates a flowchart or method 900 for assembling various components and parts to form adjustable diameter step pin apparatus and system (300 or 300-A), according to certain embodiments. For example, the method 900 may be described for apparatus 300. The method 900 may be applied to form the apparatus 300-A.

At step 902, the method includes coupling the collet 102 to the adjustable diameter step pin apparatus 300. The adjustable diameter step pin apparatus 300 includes the body element 110, which includes the plurality of threaded finish structures 304. In an embodiment, the plurality of threaded finish structures 304 may be formed in the interior portion of the body element 110. The body element 110 may be configured to receive the collet 102 along the longitudinal slot 112 (for example, concentric bore). The adjustable diameter step pin apparatus 300 includes the head element 120, including the thumb screw portion 128 that may be configured to rotate to alter the collet 102, and the threaded portion 126 configured to engage with the plurality of threaded finish structures 304 when assembled with the body element 110.

In some embodiments, the head element 120 may be a thumb screw and includes the collet chamber 122 configured to couple to the collet 102. The method further includes receiving the collet 102 coupled to the collet chamber 122 by the body element 110 along the longitudinal slot 112 (for example, concentric bore). In an embodiment, the collet 102 may be configured to receive a gauge pin set after assembling and forming the apparatus 300.

At step 904, the method includes rotating the thumb screw portion 128 of the head element 120 to engage the threaded portion 126 of the head element 120 into the plurality of threaded finish structures 304 while keeping the body element 110 sturdy. In an embodiment, the head element 120 includes the hollow center portion 124 that may be concentric to the longitudinal slot 112 to form the slotted path 302 with the body element 110. This enables the apparatus 300 to fit or couple with any gauge pin sets of any size 802 as shown in FIG. 8.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An adjustable diameter step pin apparatus, comprising:
- a body element comprising a plurality of threaded finish structures, wherein the body element is configured to receive a collet along a longitudinal slot; and
- a head element comprising:
  - a thumb screw portion configured to rotate to alter the collet; and
  - a threaded portion configured to engage with the plurality of threaded finish structures when assembled with the body element;
- wherein the head element is rotatable to engage the threaded portion of the head element into the plurality of threaded finish structures to alter the collet while keeping the body element sturdy.

2. The adjustable diameter step pin apparatus of claim 1, wherein the plurality of threaded finish structures is formed in an interior portion of the body element.

3. The adjustable diameter step pin apparatus of claim 1, wherein the head element comprises a collet chamber configured to couple to the collet, wherein the collet coupled to the collet chamber is received by the body element along the longitudinal slot.

4. The adjustable diameter step pin apparatus of claim 1, wherein the collet comprises a plurality of threaded tapering sides.

5. The adjustable diameter step pin apparatus of claim 1, wherein the head element comprises a hollow center portion concentric at the longitudinal slot to form a slotted path with the body element.

6. The adjustable diameter step pin apparatus of claim 1, wherein the collet is configured to receive a gauge pin set.

7. The adjustable diameter step pin apparatus of claim 1, wherein the head element is a thumb screw.

8. An adjustable diameter step pin system, comprising:
- a collet having a collet inside diameter;
- a body element comprising:
  - a knob comprising a plurality of threaded finish structures; and
  - a precision ground shaft element attached to the knob, the knob and the precision ground shaft element define a longitudinal slot; and
- a head element comprising:
  - a thumb screw portion configured to rotate to alter a predetermined size of the collet about the collet inside diameter;
  - a threaded portion configured to engage with the plurality of threaded finish structures when assembled with the body element; and
  - a collet chamber configured to couple to the collet, wherein the collet coupled to the collet chamber is received by the body element along the longitudinal slot;
- wherein the collet inside diameter of the collet is altered by rotating the thumb screw portion of the head element to engage the threaded portion of the head element into the plurality of threaded finish structures while keeping the body element sturdy.

9. The adjustable diameter step pin system of claim 8, wherein the collet comprises a plurality of threaded tapering sides.

10. The adjustable diameter step pin system of claim 8, wherein the collet is configured to receive a gauge pin set.

11. The adjustable diameter step pin system of claim 8, wherein the plurality of threaded finish structures is formed in an interior portion of the knob of the body element.

12. The adjustable diameter step pin system of claim 8, wherein the head element comprises a hollow center portion concentric at the longitudinal slot to form a slotted path with the knob and the precision ground shaft element of the body element.

13. The adjustable diameter step pin system of claim 8, wherein the head element is a thumb screw.

14. A method of assembling an adjustable diameter step pin apparatus, the method comprising:
- coupling a collet to the adjustable diameter step pin apparatus, wherein the adjustable diameter step pin apparatus comprising:
  - a body element comprising a plurality of threaded finish structures, wherein the body element is configured to receive the collet along a longitudinal slot;
  - a head element comprising:
    - a thumb screw portion configured to rotate to alter the collet; and
    - a threaded portion configured to engage with the plurality of threaded finish structures when assembled with the body element; and
- rotating the thumb screw portion of the head element to engage the threaded portion of the head element into the plurality of threaded finish structures while keeping the body element sturdy.

15. The method of claim 14, wherein the plurality of threaded finish structures is formed in an interior portion of the body element.

16. The method of claim 14, wherein the head element comprises a collet chamber configured to couple to the collet, and the method further comprising receiving the collet coupled to the collet chamber by the body element along the longitudinal slot.

17. The method of claim 14, wherein the collet comprises a plurality of threaded tapering sides.

18. The method of claim 14, wherein the head element comprises a hollow center portion concentric at the longitudinal slot to form a slotted path with the body element.

19. The method of claim 14, wherein the collet is configured to receive a gauge pin set.

20. The method of claim 14, wherein the head element is a thumb screw.

* * * * *